United States Patent
Choa et al.

(10) Patent No.: US 9,796,897 B2
(45) Date of Patent: Oct. 24, 2017

(54) THERMALLY CONDUCTIVE CERAMIC-POLYMER COMPOSITE AND METHOD OF PREPARING THE SAME

(71) Applicant: Industry-University Cooperation Foundation Hanyang University Erica Campus, Gyeonggi-do (KR)

(72) Inventors: Yong Ho Choa, Gyeonggi-do (KR); Gyunbok Kim, Seoul (KR); Seunghan Ryu, Gyeonggi-do (KR); Manwar Hussain, Gyeonggi-do (KR); Austin Pil Joong Yoon, Gyeonggi-do (KR); Keum Suk Seo, Gyeonggi-do (KR)

(73) Assignee: INDUSTRY-UNIVERSITY COOPERATION FOUNDATION HANYANG UNIVERSITY ERICA CAMPUS, Gyeonggi-Do (KR)

( * ) Notice: Subject to any disclaimer, the term of this patent is extended or adjusted under 35 U.S.C. 154(b) by 38 days.

(21) Appl. No.: 14/771,024

(22) PCT Filed: Feb. 26, 2014

(86) PCT No.: PCT/KR2014/001545
§ 371 (c)(1),
(2) Date: Aug. 27, 2015

(87) PCT Pub. No.: WO2014/133309
PCT Pub. Date: Sep. 4, 2014

(65) Prior Publication Data
US 2016/0046851 A1    Feb. 18, 2016

(30) Foreign Application Priority Data

Feb. 27, 2013 (KR) .................. 10-2013-0020874

(51) Int. Cl.
*C09K 5/14* (2006.01)
*B29B 9/16* (2006.01)
(Continued)

(52) U.S. Cl.
CPC .................. *C09K 5/14* (2013.01); *B29B 9/16* (2013.01); *B29C 43/003* (2013.01);
(Continued)

(58) Field of Classification Search
CPC ........... C09K 5/14; B29C 43/003; B29B 9/16; B29B 2009/163
See application file for complete search history.

(56) References Cited

FOREIGN PATENT DOCUMENTS

| JP | 2010-013580 | 1/2010 |
|---|---|---|
| JP | 2012-122057 | 5/2012 |

(Continued)

OTHER PUBLICATIONS

International Search Report for related International Application No. PCT/KR2014/001545; report dated Jun. 2, 2014.

*Primary Examiner* — Robert Harlan
(74) *Attorney, Agent, or Firm* — Miller, Matthias & Hull LLP (57) ABSTRACT

Provided are a thermally conductive ceramic-polymer composite in which thermoplastic polymers form a matrix, and planar fragments of thermally conductive ceramic or thermally conductive ceramic powder is uniformly dispersed on a grain boundary between thermoplastic polymer particles, thereby forming a thermal pathway, wherein the thermoplastic polymer particles are formed in a faceted shape, and the average size of the planar fragments of thermally conductive ceramic or thermally conductive ceramic powder is smaller than 1/10 of that of the thermoplastic polymer particles, and a method of preparing the same. Accordingly, since dispersion and interfacial affinity of a thermally con- (Continued)

ductive ceramic filler are maximized, excellent electrical insulation and excellent thermal conductivity can be exhibited even with a small content of the thermally conductive ceramic filler.

10 Claims, 5 Drawing Sheets

(51) Int. Cl.
*B29C 43/00* (2006.01)
*C08K 3/00* (2006.01)
*B29K 33/00* (2006.01)
*B29K 105/16* (2006.01)
*B29K 105/00* (2006.01)
*B29K 509/04* (2006.01)
*B29L 31/34* (2006.01)

(52) U.S. Cl.
CPC ...... *C08K 3/0033* (2013.01); *B29B 2009/163* (2013.01); *B29K 2033/12* (2013.01); *B29K 2105/16* (2013.01); *B29K 2105/253* (2013.01); *B29K 2509/04* (2013.01); *B29K 2995/0013* (2013.01); *B29L 2031/3468* (2013.01)

(56) References Cited

FOREIGN PATENT DOCUMENTS

| KR | 10-362961 | 11/2002 | | |
|---|---|---|---|---|
| KR | 10-2011-0090974 | 8/2011 | | |
| KR | 10-2011-0124127 | 11/2011 | | |
| KR | 10-20110019127 | * 11/2011 | ............... | C08K 3/38 |
| KR | 10-1124100 | 2/2012 | | |
| KR | 10-1216794 | 12/2012 | | |

* cited by examiner

Fig. 9

THERMALLY CONDUCTIVE CERAMIC-POLYMER COMPOSITE AND METHOD OF PREPARING THE SAME

CROSS-REFERENCE TO RELATED APPLICATIONS

This application is a 35 USC §371 US National Stage patent application of International Patent Application No. PCT/KR2014/001545 filed on Feb. 26, 2014, which claims priority to Korean Patent Application No. 10-2013-0020874, filed on Feb. 27, 2013.

FIELD OF THE DISCLOSURE

A ceramic-polymer composite and a method of preparing the same, and more particularly, to a thermally conductive ceramic-polymer composite in which dispersion and interfacial affinity of a thermally conductive ceramic filler are maximized, thereby exhibiting excellent electrical insulation and excellent thermal conductivity even with a small content of the thermally conductive ceramic filler, and a method of preparing the same.

BACKGROUND OF THE DISCLOSURE

Recently, to make a smaller and highly functionalized electronic system, heat generating elements are concentrated therein, and thus a method of efficiently cooling the elements is required. In addition, there is a demand for a method of effectively controlling heat generated from a secondary battery while an electric vehicle is driven using the secondary battery as a power source.

Generally, heat generated from electronic systems or secondary batteries is dissipated into the air, and a general heat dissipating method is mainly performed using a heat dissipation device manufactured of a metal with excellent thermal conductivity such as aluminum or copper. However, such a method cannot ensure electrical insulation, and thus a separate device such as a fuse is needed, and due to the properties of the metal, the device generally becomes heavy.

To overcome such a disadvantage, a method of preparing a composite material by dispersing inorganic particles having high thermal conductivity into a resin formed in a matrix, for example, a silicon-based resin or an epoxy-based resin.

In terms of a material for a thermally conductive filler in the thermally conductive polymer composite material, metal particles are effective in improving thermal conductivity, but do not have electrical insulation and thus are not conventionally used as a thermally conductive filler. Mostly, among metal oxides and metal nitrides, one that has excellent thermal conductivity and electrical insulation has been used as the thermally conductive filler.

To obtain the high thermal conductivity, a composite material is prepared by dispersing a considerable amount of thermally conductive filler into an epoxy- or silicon-based resin. However, according to the above-described method, first, a cost is increased, and second, viscosity is sharply increased and a mechanical property and a molding property are sharply decreased, and therefore it is difficult to actually take advantage of a thermally conductive polymer composite material. Accordingly, to ensure mobility for injection molding and optimum levels of physical properties, the current development of the thermally conductive polymer composite material is progressing to obtain optimal thermal conductivity with the minimum content of the thermally conductive filler.

To obtain the optimal thermal conductivity with the minimum content of the thermally conductive filler, phonon-scattering occurring in heat transfer has to be minimized. In addition, a thermal pathway in which thermally conductive fillers are in direct contact with each other in a polymer matrix has to be formed, and specifically, the thermally conductive fillers have to be arranged in desired positions.

However, it is difficult to construct sufficient thermal pathways by a conventional technique of preparing a thermally conductive ceramic-polymer composite material, for example, simply mixing a thermally conductive ceramic and a liquid polymer or polymer powder.

Therefore, to obtain the optimal thermal conductivity with the minimum content of the thermally conductive filler, it is necessary to develop the thermally conductive polymer composite material in which the thermal pathway of the thermally conductive fillers in the polymer matrix of the composite material is formed, and which uses a method of forming chemical bonds at the interface between the ceramic filler and the polymer matrix.

SUMMARY OF THE DISCLOSURE

A thermally conductive ceramic-polymer composite in which dispersion and interfacial affinity of a thermally conductive ceramic filler are maximized, thereby exhibiting excellent electrical insulation and excellent thermal conductivity even with a small content of a thermally conductive ceramic filler, a separate device such as a fuse is not needed because the electrical insulation is ensured when the composite is applied to an electronic system or a secondary battery, and is light, and a method of preparing the same.

A thermally conductive ceramic-polymer composite is disclosed in which thermoplastic polymers form a matrix, planar fragments of thermally conductive ceramic or thermally conductive ceramic powder is uniformly dispersed on a grain boundary between thermoplastic polymer particles, thereby forming a thermal pathway, the thermoplastic polymer particles being formed in a faceted shape. Here, the average size of the planar fragments of thermally conductive ceramic or thermally conductive ceramic powder is smaller than 1/10 of that of the thermoplastic polymer particles.

The planar fragments of thermally conductive ceramic or thermally conductive ceramic powder is surface-treated with a coupling agent, thereby forming chemical bonds with the thermoplastic polymer particles, and may consist of one or more selected from boron nitride, aluminum nitride, magnesium oxide, aluminum oxide, silicon carbide and silicon nitride.

The thermoplastic polymer may consist of one or more materials selected from acrylonitrilebutadienestyrene, polymethylmethacrylate, polyamide, polybutadiene terephthalate, polyethylene terephthalate, polycarbonate, polyethylene, polyetheretherketone, polypropylene, polystyrene and polymethylsilsesquinoxane, and the volumetric ratio of the planar fragments of thermally conductive ceramic or thermally conductive ceramic powder to the thermoplastic polymer may be 1:3 to 30.

A volume of the planar fragments of thermally conductive ceramic or thermally conductive ceramic powder located on the grain boundary between the thermoplastic polymer particles is at least 90% of a volume of the planar fragments of thermally conductive ceramic or thermally conductive ceramic powder distributed in the entire matrix.

A method of preparing a thermally conductive ceramic-polymer composite, may include: (a) surface-treating planar fragments of thermally conductive ceramic or thermally conductive ceramic powder with a coupling agent to induce chemical bonds of the planar fragments of thermally conductive ceramic or thermally conductive ceramic powder to be uniformly coated on thermoplastic polymer beads, (b) adding the thermoplastic polymer beads and the surface-treated planar fragments of thermally conductive ceramic or thermally conductive ceramic powder to a solvent having insolubility with respect to the thermoplastic polymer beads to be dispersed, (c) forming ceramic-polymer composite powder in which the planar fragments of thermally conductive ceramic or thermally conductive ceramic powder is coated on surfaces of the thermoplastic polymer beads by evaporating the solvent, and (d) molding the ceramic-polymer composite powder by applying pressure, wherein the average size of the planar fragments of thermally conductive ceramic or thermally conductive ceramic powder is smaller than 1/10 of that of the thermoplastic polymer beads.

The planar fragments of thermally conductive ceramic or thermally conductive ceramic powder may consist of one or more materials selected from boron nitride, aluminum nitride, magnesium oxide, aluminum oxide, silicon carbide and silicon nitride.

The thermoplastic polymer beads may consist of one or more materials selected from acrylonitrilebutadiene styrene, polymethylmethacrylate, polyamide, polybutadiene terephthalate, polyethylene terephthalate, polycarbonate, polyethylene, polyetheretherketone, polypropylene, polystyrene and polymethylsilsesquinoxane, and have an average size of 100 nm to 100 μm.

In the operation (b), the planar fragments of thermally conductive ceramic or thermally conductive ceramic powder and the thermoplastic polymer beads may be added at a volumetric ratio of 1:3 to 30.

The coupling agent may be one or more coupling agents selected from a silicon-based coupling agent, a zirconium-based coupling agent and a titanium-based coupling agent, and may be added at 0.1 to 5.0 parts by weight with respect to 100 parts by weight of the planar fragments of thermally conductive ceramic or thermally conductive ceramic powder to perform the surface treatment.

The molding may be performed by applying a pressure in a range of 10 to 1000 MPa at a temperature ranging from a glass transition temperature or higher of the thermoplastic polymer beads to less than a melting point of the thermoplastic polymer beads to increase a contact interface between the thermoplastic polymer beads.

In the operation (a), the surface treatment is performed by adding the planar fragments of thermally conductive ceramic or thermally conductive ceramic powder and the coupling agent to the solvent, and the solvent used in the operation (a) may have a pH ranging from 2.0 to 6.5.

An electrically insulating and thermally conductive ceramic-polymer composite, in which dispersion and interfacial affinity of the thermally conductive ceramic filler in a polymer are maximized, thereby exhibiting excellent electrical insulation and excellent thermal conductivity in all aspects even with a small content of a thermally conductive ceramic filler in manufacture of a molding product, does not need a separate device such as a fuse since the electrical insulation is ensured when the composite is applied to an electronic system or a secondary battery, and is light.

The thermally conductive ceramic-polymer composite may be applied to a product requiring high electrical insulation and thermal conductivity, and enables to be applied to a heat dissipation packaging for increasing the life cycle of a battery pack for high capacity electric vehicles and ensuring safety, a heat sink component or its interface used to cool heat generating elements installed in a compact and integrated electronic system such as a wireless communication repeater, a liquid crystal display (LCD), plasma display panel (PDP) or light emitting diode (LED) TV, a computer, or a notebook computer to ensure safety of the elements.

In addition, the thermally conductive ceramic-polymer composite may drastically enhance heat dissipating efficiency and insulating efficiency of a material exhibiting a high heat generation rate such as a battery for high-speed electric vehicles, and also be applied to a material for a thermal control component of an energy storage system (ESS) of an electric vehicle for high speed driving.

In addition, the thermally conductive ceramic-polymer composite can be applied to an electric automotive application component that will bring a higher value in the future, a micro processing unit (MPU), a navigation system, or a housing encasing an engine of an electric vehicle.

DETAILED DESCRIPTION

In a thermally conductive ceramic-polymer composite according to an exemplary embodiment of the present invention, thermoplastic polymers form a matrix, and planar fragments of thermally conductive ceramic or thermally conductive ceramic powder is uniformly dispersed on a grain boundary between thermoplastic polymer particles, thereby forming a thermal pathway, wherein the thermoplastic polymer particles are formed in a faceted shape, and the average size of the planar fragments of thermally conductive ceramic or thermally conductive ceramic powder is smaller than 1/10 of that of the thermoplastic polymer particles.

A method of preparing a thermally conductive ceramic-polymer composite according to an exemplary embodiment of the present invention includes: (a) surface-treating planar fragments of thermally conductive ceramic or thermally conductive ceramic powder with a coupling agent to induce chemical bonds of the planar fragments of thermally conductive ceramic or thermally conductive ceramic powder to be uniformly coated on thermoplastic polymer beads, (b) adding the thermoplastic polymer beads and the surface-treated planar fragments of thermally conductive ceramic or thermally conductive ceramic powder to a solvent having insolubility with respect to the thermoplastic polymer beads to be dispersed, (c) forming ceramic-polymer composite powder in which the planar fragments of thermally conductive ceramic or thermally conductive ceramic powder is coated on surfaces of the thermoplastic polymer beads by evaporating the solvent, and (d) molding the ceramic-polymer composite powder by applying pressure, wherein the average size of the planar fragments of thermally conductive ceramic or thermally conductive ceramic powder is smaller than 1/10 of that of the thermoplastic polymer beads.

Hereinafter, exemplary embodiments of the present invention will be described in detail with respect to the accompanying drawings. However, the exemplary embodiments are provided to fully understand the present invention by those of ordinary skill in the art, and may be modified in various forms, and the scope of the present invention is not limited to the exemplary embodiments which will be described below.

The present invention provides a thermally conductive ceramic-polymer composite prepared through enhancement of an interfacial bonding strength of ceramic-polymer composite powder, and a method of forming electrical insulating and thermally conductive ceramic-polymer composite powder, and preparing a thermally conductive ceramic-polymer composite which can be used as a heat sink or a thermal interface material using the powder. To this end, in the present invention, ceramic-polymer composite powder is prepared by coating surfaces of polymer beads with thermally conductive ceramic fragments or thermally conductive ceramic powder by chemical bonding, and then a thermally conductive ceramic-polymer composite in which a uniform thermal pathway is formed in a thermoplastic polymer matrix and an excellent interfacial bonding strength is exhibited is prepared.

In the thermally conductive ceramic-polymer composite according to an exemplary embodiment of the present invention, thermoplastic polymers form a matrix, a thermal pathway is formed by uniformly dispersing planar fragments of thermally conductive ceramic or thermally conductive ceramic powder on a grain boundary between thermoplastic polymer particles, wherein the thermoplastic polymer particles are formed in a faceted shape, and the average size of the planar fragments of the thermally conductive ceramic or thermally conductive ceramic powder is smaller than 1/10 of that of the thermoplastic polymer particles.

The planar fragments of thermally conductive ceramic or thermally conductive ceramic powder is surface-treated with a coupling agent, thereby forming chemical bonding with the thermoplastic polymer particles, and may consist of one or more materials selected from boron nitride, aluminum nitride, magnesium oxide, aluminum oxide, silicon carbide and silicon nitride.

The thermoplastic polymer may consist of one or more materials selected from acrylonitrile butadiene styrene (ABS), PMMA, polyamide, polybutadieneterephthalate (PBT), polyethylene terephthalate (PET), polycarbonate (PC), polyethylene (PE), polyetheretherketone (PEEK), polypropylene (PP), polystyrene (PS), and polymethylsilsesquioxane (PMSQ), and the volumetric ratio of the planar fragments of thermally conductive ceramic or thermally conductive ceramic powder to the thermoplastic polymers may be 1:3 to 30.

A volume of the planar fragments of thermally conductive ceramic or thermally conductive ceramic powder located on the grain boundary between the thermoplastic polymer particles is at least 90% of a volume of the planar fragments of thermally conductive ceramic or thermally conductive ceramic powder distributed in the entire matrix.

A method of preparing a thermally conductive ceramic-polymer composite according to an exemplary embodiment of the present invention includes: (a) surface-treating planar fragments of thermally conductive ceramic or thermally conductive ceramic powder with a coupling agent to induce chemical bonds of the planar fragments of thermally conductive ceramic or thermally conductive ceramic powder to be uniformly coated on thermoplastic polymer beads, (b) adding the thermoplastic polymer beads and the surface-treated planar fragments of thermally conductive ceramic or thermally conductive ceramic powder to a solvent having insolubility with respect to the thermoplastic polymer beads to be dispersed, (c) forming ceramic-polymer composite powder in which the planar fragments of thermally conductive ceramic or thermally conductive ceramic powder is coated on surfaces of the thermoplastic polymer beads by evaporating the solvent, and (d) molding the ceramic-polymer composite powder by applying pressure, wherein the average size of the planar fragments of thermally conductive ceramic or thermally conductive ceramic powder is smaller than 1/10 of that of the thermoplastic polymer beads.

The planar fragments of thermally conductive ceramic or thermally conductive ceramic powder may consist of one or more selected from boron nitride, aluminum nitride, magnesium oxide, aluminum oxide, silicon carbide and silicon nitride.

The thermoplastic polymer beads may consist of one or more materials selected from acrylonitrile butadiene styrene, PMMA, polyamide, polybutadieneterephthalate, polyethylene terephthalate, polycarbonate, polyethylene, polyetheretherketone, polypropylene, polystyrene and polymethylsilsesquioxane, and have an average size of 100 nm to 100 μm.

In the operation (b), the planar fragments of thermally conductive ceramic or thermally conductive ceramic powder, and the thermoplastic polymer beads may be added at a volumetric ratio of 1:3 to 30.

The coupling agent may be one or more coupling agents selected from a silicon-based coupling agent, a zirconium-based coupling agent and a titanium-based coupling agent, and may be added at 0.1 to 5.0 parts by weight with respect to 100 parts by weight of the planar fragments of thermally conductive ceramic or thermally conductive ceramic powder to perform the surface treatment.

The molding may be performed by applying a pressure in a range of 10 to 1000 MPa at a temperature ranging from a glass transition temperature or higher of the thermoplastic polymer beads to less than a melting point of the thermoplastic polymer beads to increase a contact interface between the thermoplastic polymer beads.

In the operation (a), the surface treatment is performed by adding the planar fragments of thermally conductive ceramic or thermally conductive ceramic powder and the coupling agent to a solvent, and the solvent used in the operation (a) preferably has a pH ranging from 2.0 to 6.5.

Hereinafter, the thermally conductive ceramic-polymer composite according to the exemplary embodiments of the present invention and the method of preparing the same will be described in further detail.

The planar fragments of thermally conductive ceramic or thermally conductive ceramic powder is surface-treated with a coupling agent. To this end, the surface treatment is performed by adding the planar fragments of thermally conductive ceramic or thermally conductive ceramic powder and the coupling agent to a solvent in which dispersion of the planar fragments of thermally conductive ceramic or thermally conductive ceramic powder can be ensured, while stirring. The surface treatment is performed to induce chemical bonds of the planar fragments of thermally conductive ceramic or thermally conductive ceramic powder, thereby uniformly coating surfaces of thermoplastic polymer beads, which will be described below. Through the surface treatment, thermally conductive ceramic-polymer composite powder in which chemical interfacial bonds are exhibited may be prepared, and dispersion and interfacial affinity of boron nitride in a thermoplastic polymer matrix may be maximized in a finally prepared thermally conductive ceramic-polymer composite.

The planar fragments of thermally conductive ceramic or thermally conductive ceramic powder added as a filler may consist of a ceramic material exhibiting electrical insulation and excellent thermal conductivity, which may be one or more selected from boron nitride, aluminum nitride, magnesium oxide, aluminum oxide, silicon carbide and silicon nitride.

The average size of the planar fragments of thermally conductive ceramic or thermally conductive ceramic powder may be smaller than $1/10$ of that of the thermoplastic polymer beads (e.g., 1 nm or more and less than 10 μm), which will be described below.

The coupling agent may be one or more coupling agents selected from a silicon-based coupling agent, a zirconium-based coupling agent and a titanium-based coupling agent, and for the surface treatment, the coupling agent may be added at 0.1 to 5.0 parts by weight with respect to 100 parts by weight of the planar fragments of thermally conductive ceramic or thermally conductive ceramic powder. As the silicon-based coupling agent, γ-glycidoxypropyl-trimethyoxysilane (GPS), 3-glycidoxypropylmethyl dimethoxysilane, 2-(3,4-epoxycyclohexyl)ethyltrimethoxy silane, or 3-methacryloxypropyltrimethoxysilane may be used. As the titanium-based coupling agent, cyclo(dioctyl)pyrophosphate dioctyltitanate may be used. As the zirconium-based coupling agent, tetra-n-propyl zirconate, tetra-n-butyl zirconate, triethanolamine zirconate or carboxy zircoaluminate may be used.

As the solvent, a suitable type of solvent for modifying a surface of the planar fragments of thermally conductive ceramic or thermally conductive ceramic powder and ensuring dispersion thereof is required, and the solvent may be isopropyl alcohol, ethanol, methanol or water, which has volatility. The solvent may have a pH ranging from 2.0 to 6.5 in order to stabilize dispersion of the planar fragments of thermally conductive ceramic or thermally conductive ceramic powder. The surface treatment may be performed at a temperature lower than a boiling point of the solvent, for example, 30 to 99° C.

Before the surface treatment with the coupling agent, a grinding process may be performed to break the thermally conductive ceramic material into planar fragments or make the thermally conductive ceramic powder finer. For example, boron nitride may have a planar structure, and may be exfoliated into planar fragments through the grinding process. The use of the exfoliated planar ceramic filler or the pulverized ceramic filler may maximize the dispersion of the thermally conductive ceramic filler in the polymer matrix.

The grinding process may be performed by various methods, and here, an exemplary process using a dry ball milling process will be described.

In the ball milling process, a thermally conductive ceramic material is charged into a ball milling machine. The thermally conductive ceramic material is mechanically mixed and ground, while rotating the ball milling machine at a predetermined speed. Balls used for the ball milling may be formed of a ceramic material such as alumina or zirconia, and have the same size, or two or more different sizes. The grinding is performed by adjusting the size of the balls, milling time, and a rotational speed per minute of the ball milling machine. For example, the size of the balls is set in a range of approximately 1 to 50 mm, and the rotational speed of the ball milling machine may be set in a range of approximately 50 to 500 rpm. The ball milling may be performed for 1 to 48 hours. The thermally conductive ceramic material may be ground into the form of planar fragments or fine powder through the ball milling, and have uniform particle size distribution.

The thermoplastic polymer beads and the surface-treated planar fragments of thermally conductive ceramic or thermally conductive ceramic powder are added to a solvent having insolubility with respect to the thermoplastic polymer beads, and dispersed. Here, the planar fragments of thermally conductive ceramic or thermally conductive ceramic powder and the thermoplastic polymer beads may be added at a volumetric ratio of 1:3 to 30. The surface-treated planar fragments of thermally conductive ceramic or thermally conductive ceramic powder and the thermoplastic polymer beads show different surface charges in the solvent. The thermoplastic polymer may be prepared in the form of a bead, and the bead-type thermoplastic polymer may be used to provide a relatively regular form of a grain boundary in the thermally conductive ceramic-polymer composite.

The thermoplastic polymer beads may consist of one or more materials selected from acrylonitrile butadiene styrene (ABS), PMMA, polyamide, polybutadieneterephthalate (PBT), polyethylene terephthalate (PET), polycarbonate (PC), polyethylene (PE), polyetheretherketone (PEEK), polypropylene (PP), polystyrene (PS), and polymethylsilsesquioxane (PMSQ). The average size of the thermoplastic polymer beads may be 100 nm to 100 μm in consideration of facilitation of production of the thermoplastic polymer beads and thermal conductivity of the thermally conductive ceramic-polymer composite.

The solvent is a solvent which does not dissolve the thermoplastic polymer beads. As the solvent, isopropyl alcohol, ethanol, methanol or water, which has volatility, may be used.

Ceramic-polymer composite powder in which the planar fragments of thermally conductive ceramic or thermally conductive ceramic powder is coated on surfaces of the thermoplastic polymer beads is formed by evaporating the solvent. The evaporation of the solvent may be performed using a vacuum evaporator. When the solvent is evaporated, the ceramic-polymer composite powder in which the planar fragments of thermally conductive ceramic or thermally conductive ceramic powder is coated on the surfaces of the thermoplastic polymer beads is obtained. The ceramic-polymer composite powder in which the planar fragments of thermally conductive ceramic or thermally conductive ceramic powder is chemically bonded to and uniformly coated on the surface of the thermoplastic polymer beads may be obtained. Since the particle size of the planar fragments of thermally conductive ceramic or thermally conductive ceramic powder is smaller than $1/10$ of that of the thermoplastic polymer beads, the ceramic-polymer composite powder in which the multiple planar fragments of thermally conductive ceramic or thermally conductive ceramic powder is distributed along the surfaces of the thermoplastic polymer beads is obtained.

A thermally conductive ceramic-polymer composite is formed through molding by applying pressure to the ceramic-polymer composite powder. The molding may be performed by a variety of methods, including injection molding, extrusion molding, compression molding, etc., and the molding is preferably performed by anisotropic hot press molding, and applied to mold the powder in a form suitable for application. To increase a contact interface between the thermoplastic polymer beads, the molding may be performed at a temperature ranging from a glass transition temperature or higher of the thermoplastic polymer beads to less than a melting point of the thermoplastic polymer beads under a pressure in a range of 10 to 1000 MPa. In the molding, as the pressure is applied at the glass transition temperature or higher of thermoplastic polymer beads, the beads are transformed into a faceted shape from a spherical shape.

The use of the thermally conductive ceramic-polymer composite powder leads to the direct contact between the thermoplastic polymers forming a matrix and the thermally conductive ceramic and the enhanced interfacial bonding between the thermally conductive ceramic and the thermoplastic polymer, and therefore, the thermally conductive ceramic-polymer composite, which exhibits high thermal conductivity, thereby creating a thermal pathway, may be prepared even with a small content of the thermally conductive ceramic. By a differentiated method from the conventional method of preparing a ceramic-polymer composite, the thermal pathway is constructed only with the small amount of the thermally conductive ceramic filler, and thus high thermal conductivity can be exhibited in vertical and horizontal directions of the thermally conductive ceramic-polymer composite.

In the thermally conductive ceramic-polymer composite prepared as described above, the thermoplastic polymers form a matrix, the planar fragments of thermally conductive ceramic or thermally conductive ceramic powder is uniformly dispersed on a grain boundary between the thermoplastic polymer particles, thereby forming the thermal pathway, and the thermoplastic polymer particles are formed in a faceted shape. The planar fragments of thermally conductive ceramic or thermally conductive ceramic powder is surface-treated with a coupling agent, and chemical bonding with the thermoplastic polymer particles is formed.

The planar fragments of thermally conductive ceramic or thermally conductive ceramic powder is mainly distributed on the grain boundary between the thermoplastic polymer particles. A volume in which the planar fragments of thermally conductive ceramic or thermally conductive ceramic powder is disposed on the grain boundary between the thermoplastic polymer particles is at least 90% (e.g., 90.0 to 99%) of a volume in which the planar fragments of thermally conductive ceramic or thermally conductive ceramic powder is distributed in the entire matrix.

The thermally conductive ceramic-polymer composite has the thermal pathway uniformly distributed along the grain boundary between the polymer particles by uniformly distributing the planar fragments of thermally conductive ceramic or thermally conductive ceramic powder along the grain boundary between the polymer particles in the polymer matrix, and exhibits excellent thermal conductivity in vertical and horizontal directions of the composite even with the small content of the thermally conductive filler. When the composite is used as a heat sink, the thermal pathway of the thermally conductive ceramic in the thermoplastic polymer matrix is maximized. As a result, the composite can be effectively used in various applications requiring excellent thermal conductivity as well as electrical insulation.

The thermally conductive ceramic-polymer composite of the present invention may be applied to manufacturing of a heat sink component or its interface.

The thermally conductive ceramic-polymer composite of the present invention may be applied to products requiring high electrical insulation and thermal conductivity, and may be applied to a heat dissipation packaging for increasing the life cycle of a battery pack for high capacity electric vehicles and ensuring safety, a heat sink component or its interface used to cool heat generating elements installed in a compact and integrated electronic system such as a wireless communication repeater, an LCD, PDP, or LED TV, a computer, or a notebook computer to ensure safety of the elements.

To package a battery for electric vehicles, a technology for manufacturing a heat sink is required, and the thermally conductive ceramic-polymer composite of the present invention can drastically enhance heat dissipating efficiency and electrical insulating efficiency of a material exhibiting a high heat generation rate such as a battery for high-speed electric vehicles, and can also be applied to a material for a thermal control component of an energy storage system (ESS) of an electric vehicle for high speed driving.

In addition, the thermally conductive ceramic-polymer composite of the present invention can be applied to an electric automotive application component that will bring a higher value in the future, a micro processing unit (MPU), a navigation system, or a housing encasing an engine of an electric vehicle.

Hereinafter, examples according to the present invention will be described in detail, but the present invention is not limited to the following examples.

Example 1

Boron nitride fragments and γ-glycidoxypropyl-trimethoxysilane were added to isopropyl alcohol having pH 4, thereby performing a surface treatment on the boron nitride fragments. While stirring, the boron nitride fragments and the γ-glycidoxypropyl-trimethoxysilane were mixed at 80° C. for 2 hours, thereby preparing the boron nitride fragments surface-treated with the γ-glycidoxypropyl-trimethoxysilane. The γ-glycidoxypropyl-trimethoxysilane and the boron nitride fragments were added at a weight ratio of 0.5:99.5, 1:99, 3:97 or 5:95, and mixed. The stirring was performed at a rotational speed of approximately 50 rpm.

PMMA beads and the surface-treated boron nitride fragments were added to a solvent having insolubility with respect to the PMMA beads, and dispersed. For dispersion, the surface-treated boron nitride fragments and the PMMA beads were added to 500 ml of isopropyl alcohol at volumetric ratios of 1:9 and 2:8, respectively, and mixed by stirring for 10 hours. The stirring was performed at a rotational speed of approximately 50 rpm.

To effectively and rapidly evaporate the solvent, i.e., isopropyl alcohol, the isopropyl alcohol and the powder were separated from each other using a vacuum evaporator, and boron nitride-PMMA composite powder was collected.

Anisotropic hot press molding was performed on the boron nitride-PMMA composite powder obtained as described above. To increase a contact interface between the PMMA beads, the hot press molding was performed for 10 minutes at 200° C., which was higher than the glass transition temperature of the PMMA beads, and a pressure of 200 MPa, thereby obtaining a boron nitride-PMMA composite.

Figure 1:
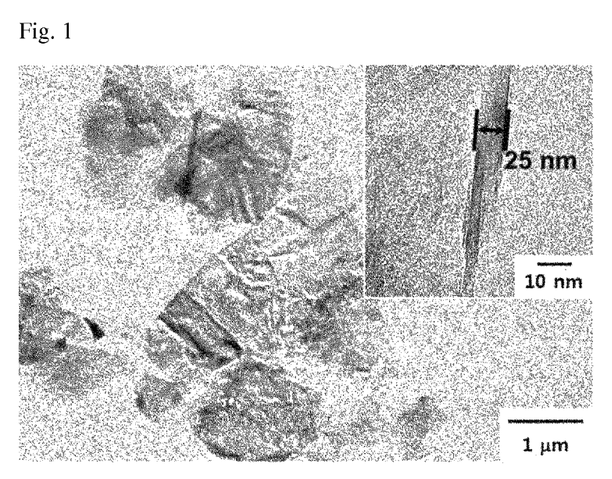
FIG. 1 is a transmission electron microscope image of boron nitride fragments used in Example 1.

FIG. 1 is a transmission electron microscope image of the boron nitride fragments used in Example 1.

Referring to FIG. 1, it was confirmed that the boron nitride fragments generally consisted of planar-shaped micro fragments, and had a size of 0.52 μm and a thickness of 20 nm.

Figure 2:
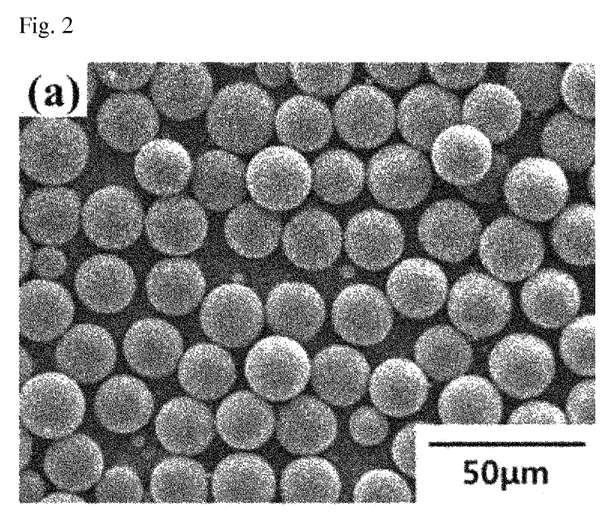
FIG. 2 is a scanning electron microscope (SEM) image of polymethylmethacrylate (PMMA) beads used in Example 1.
Figure 3:
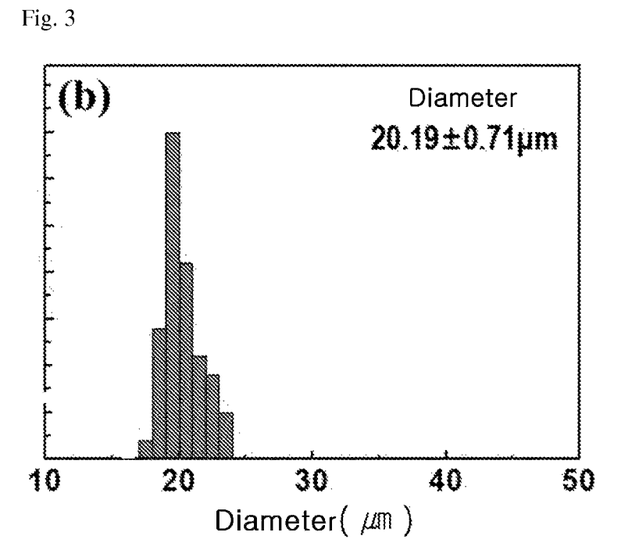
FIG. 3 is a graph of diameter distribution of the PMMA beads used in Example 1.

FIG. 2 is an SEM image of the PMMA beads used in Example 1, and FIG. 3 is a graph of diameter distribution of the PMMA beads used in Example 1.

Referring to FIGS. 2 and 3, it was confirmed that the PMMA beads are spherical and monodispersed beads, and the average diameter of the PMMA beads was 20.19 μm.

Figure 4:
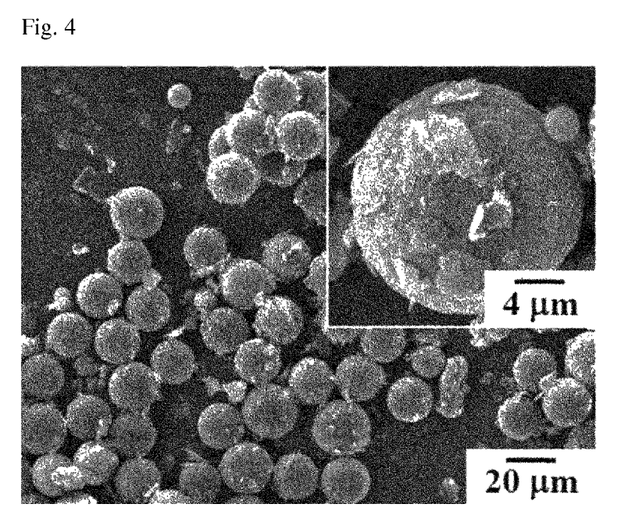
FIG. 4 is an SEM image of boron nitride-PMMA composite powder prepared according to Example 1.

FIG. 4 is an SEM image of the boron nitride-PMMA composite powder prepared according to Example 1, wherein the γ-glycidoxypropyl-trimethoxysilane and the boron nitride fragments were added at a weight ratio of 3:97 and mixed, and the boron nitride fragments and the PMMA beads were added at a volumetric ratio of 1:9.

Referring to FIG. 4, planar particles of the boron nitride were evenly dispersed on surfaces of the PMMA beads.

Figure 5:
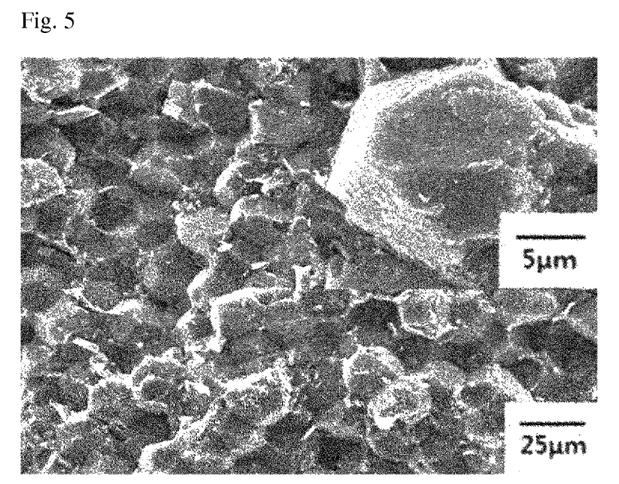
FIG. 5 is an SEM image of a cross-section of a boron nitride-PMMA composite obtained by hot press molding according to Example 1.

FIG. 5 is an SEM image of a cross-section of the boron nitride-PMMA composite obtained by hot press molding according to Example 1, wherein the γ-glycidoxypropyl-trimethoxysilane and the boron nitride fragments were added at a weight ratio of 3:97 and mixed, and the boron nitride fragments and the PMMA beads were added at a volumetric ratio of 1:9.

Referring to FIG. 5, after the hot press molding, a faceted microstructure was basically observed in the boron nitride-PMMA composite, and it was confirmed that the boron nitride fragments were distributed on the faceted grain boundary. Meanwhile, it was confirmed that the boron nitride particles were uniformly dispersed in the entire PMMA matrix. In the boron nitride-PMMA composite, the boron nitride fragments were uniformly dispersed on the PMMA grain boundary, thereby forming a thermal pathway, and enhanced thermal conductivity of the boron nitride-PMMA composite can be expected.

To more easily examine the characteristics of Example 1, comparative examples that can be compared to the examples of the present invention will be provided. It should be established that Comparative Examples 1 and 2, which will be described below, are merely provided to be simply compared to the characteristics of Example 1, and are not to be included in the prior art of the present invention.

Comparative Example 1

PMMA beads and boron nitride fragments were added to a solvent having insolubility with respect to the PMMA beads and dispersed. For dispersion, the boron nitride fragments and the PMMA beads were added to 500 ml of isopropyl alcohol at a volumetric ratio of 1:9, and mixed by stirring for 10 hours. A surface treatment with γ-glycidoxypropyl-trimethoxysilane was not performed on the boron nitride fragments.

To effectively and rapidly evaporate the solvent, isopropyl alcohol, the isopropyl alcohol and the powder were separated from each other using a vacuum evaporator, and boron nitride-PMMA composite powder was collected.

Anisotropic hot press molding was performed on the boron nitride-PMMA composite powder obtained as described above. To increase a contact interface between the PMMA beads, the hot press molding was performed for 10 minutes at 200° C., which was higher than the glass transition temperature of the PMMA beads, and a pressure of 200 MPa, thereby obtaining a boron nitride-PMMA composite.

Comparative Example 2

The PMMA beads used in Example 1 was added and dissolved in dimethylformamide (DMF) as a solvent which can dissolve PMMA, and the boron nitride fragments used in Example 1 were added and dispersed. The boron nitride fragments and the PMMA beads were added at volumetric ratios of 1:9 and 2:8, respectively, and dispersed by stirring for 10 hours.

A boron nitride-PMMA composite in which the boron nitride fragments were evenly distributed in an entire PMMA matrix was obtained by molding a product obtained by dispersing the boron nitride fragments in PMMA. The boron nitride-PMMA composite obtained as described above was a composite in which boron nitride was simply dispersed in the PMMA matrix, wherein the boron nitride is evenly distributed in the entire matrix, not distributed mainly on a grain boundary of the PMMA.

Figure 6:
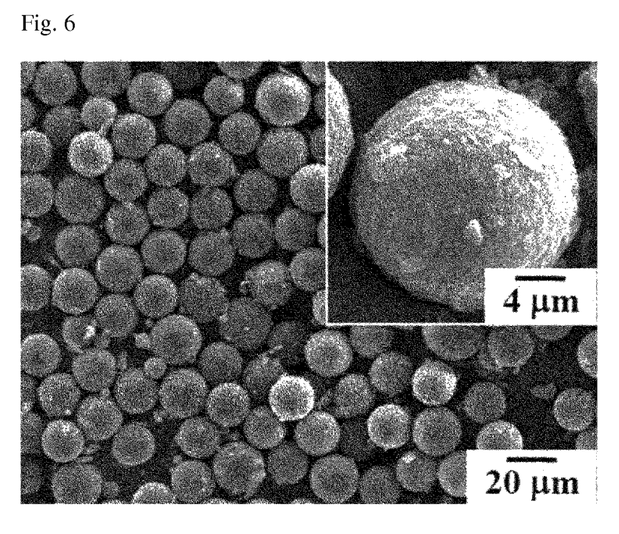
FIG. 6 is an SEM image of boron nitride-PMMA composite powder prepared according to Comparative Example 1.

FIG. 6 is an SEM image of the boron nitride-PMMA composite powder prepared according to Comparative Example 1.

Referring to FIG. 6, it was confirmed that planar particles of the boron nitride were not evenly distributed on surfaces of the PMMA beads.

Figure 7:
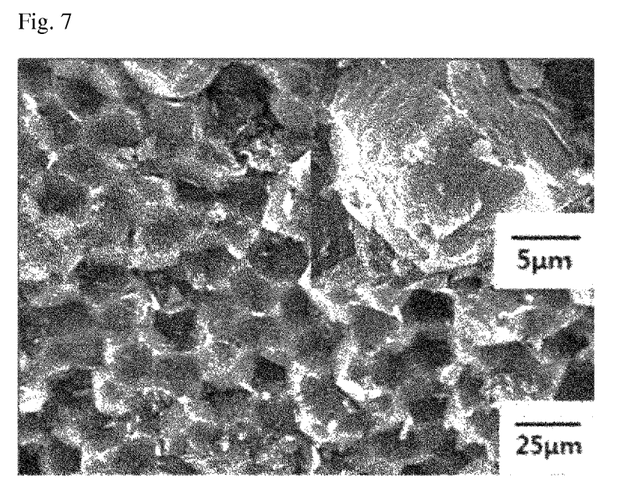
FIG. 7 is an SEM image of a cross-section of a boron nitride-PMMA composite obtained by hot press molding according to Comparative Example 1.

FIG. 7 is an SEM image of a cross-section of the boron nitride-PMMA composite obtained by hot press molding according to Comparative Example 1.

Referring to FIG. 7, a faceted micro structure, which is the same as that in Example 1, was observed in the boron nitride-PMMA composite after the hot press molding, and it was confirmed that the boron nitride was mainly distributed on a faceted grain boundary, and in all aspects, the boron nitride particles were non-uniformly dispersed in the entire PMMA matrix. It was noted that the boron nitride fragments were present on the PMMA grain boundary in the boron nitride-PMMA composite, and a non-uniform thermal pathway was formed, and thus thermal conductivity lower than that in Example 1 can be expected.

The following experimental examples show results of experiments for comparing the characteristics of Example 1 and Comparative Examples 1 and 2 according to the present invention to more easily examine the characteristics of Example 1 according to the present invention.

Experimental Example 1

To examine the effect of the surface treatment of boron nitride with the γ-glycidoxypropyl-trimethoxysilane (GPS) on a heat dissipating property of the composite, heat dissipation properties of the boron nitride-PMMA composite prepared according to Example 1 and the boron nitride-PMMA composite prepared according to Comparative Example 1 were compared.

Figure 8:
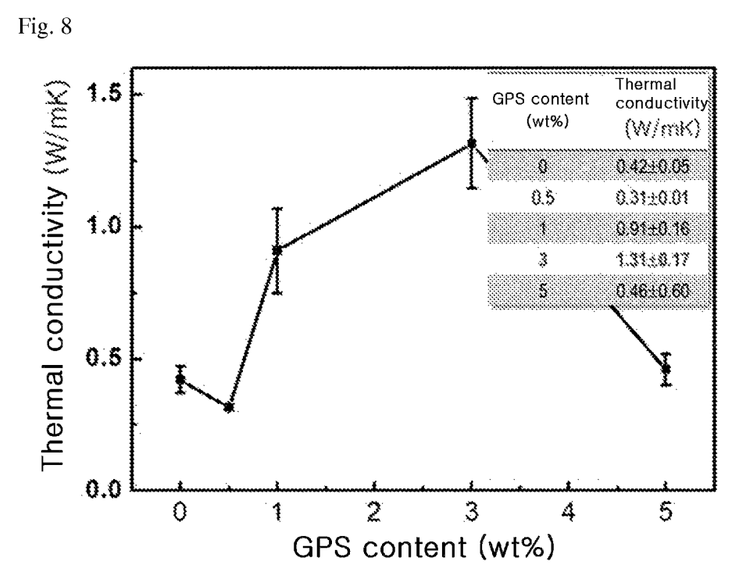
FIG. 8 is a graph of thermal conductivity of the boron nitride-PMMA composites prepared according to Example 1 and Comparative Example 1 according to the addition of the γ-glycidoxypropyl-trimethoxysilane (GPS), measured by a heat flow method.

FIG. 8 is a graph of thermal conductivity of the boron nitride-PMMA composites prepared according to Example 1 and Comparative Example 1 according to the addition of the γ-glycidoxypropyl-trimethoxysilane (GPS), which is measured by a heat flow method, wherein the boron nitride fragments and the PMMA beads were added at a volumetric ratio of 1:9.

Referring to FIG. 8, in the boron nitride-PMMA composite prepared without using the γ-glycidoxypropyl-trimethoxysilane (GPS) (in FIG. 8, the boron nitride-PMMA composite prepared according to Comparative Example 1 in which a GPS content was 0), a thermal conductivity was measured at 0.42 W/mK. In the boron nitride-PMMA composite prepared by adding 3 wt % γ-glycidoxypropyl-trimethoxysilane (GPS) (in FIG. 8, the boron nitride-PMMA composite prepared according to Example 1 in which a GPS content was 3 wt %), a thermal conductivity was measured at 1.313 W/mK, and it is confirmed that the thermal conductivity of the boron nitride-PMMA composite prepared by adding 3 wt % γ-glycidoxypropyl-trimethoxysilane (GPS) was approximately 300% higher than that of the boron nitride-PMMA composite prepared without using the γ-glycidoxypropyl-trimethoxysilane (GPS). Meanwhile, it was confirmed that, when 5 wt % γ-glycidoxypropyl-trimethoxysilane (GPS) was added, compared to when the 3 wt % γ-glycidoxypropyl-trimethoxysilane (GPS) was added, the thermal conductivity rather decreased.

Experimental Example 2

To examine the effect of the arrangement of ceramic fillers of the composite on the increase in thermal conductivity, heat dissipation properties of the composite having an aligned boron nitride (BN) arrangement prepared according to Example 1 (the boron nitride-PMMA composite prepared according to Example 1) and the composite in which boron nitride was simply dispersed (the boron nitride-PMMA composite prepared according to Comparative Example 2) were compared.

Figure 9:
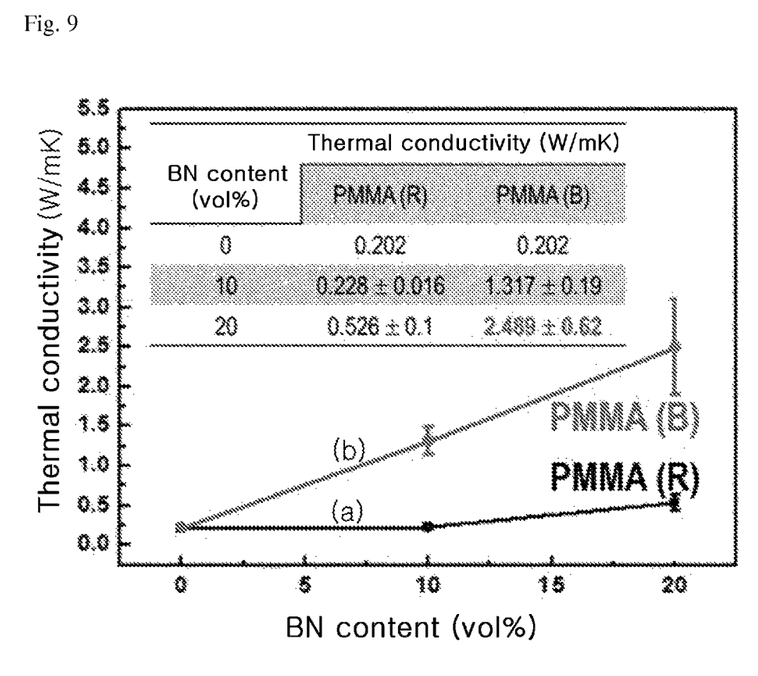
FIG. 9 is a graph of comparison of thermal conductivity measured according to the content of boron nitride in the boron nitride-PMMA composite through the heat flow method.

FIG. 9 is a graph of comparison of thermal conductivities measured according to the content of boron nitride in the boron nitride-PMMA composite through a heat flow method.

Referring to FIG. 9, an increase in thermal conductivity was observed according to the input of boron nitride under all conditions. Meanwhile, it was confirmed that, in the composition in which boron nitride was not regularly arranged but simply dispersed (represented as PMMA® in FIG. 9(a)), when an input of boron nitride was 10 vol % (when the boron nitride fragments and the PMMA beads were added at a volume ratio of 1:9), a thermal conductivity was measured at 0.228 W/mK, and when an input of boron nitride was 20 vol % (the boron nitride fragments and the PMMA beads were added at a volumetric ratio of 2:8), a thermal conductivity was measured at 0.526 W/mK.

However, it was confirmed that, in the boron nitride-PMMA composite prepared according to Example 1 (represented as PMMA (B) in FIG. 9(b)), when an input of boron nitride was 10 vol %, a thermal conductivity was measured at 1.317 W/mK, and when an input of boron nitride was 20 vol %, a thermal conductivity was measured at 2.489 W/mK. It can be confirmed that the composition according to Example 1 had a heat dissipation property 1232% higher than the thermal conductivity of pure PMMA.

Hereinabove, the present invention is explained in detail with reference to the exemplary embodiments, but the present invention is not limited to the above-described embodiments, and enables to be modified in various forms by those of ordinary skill in the art within the technical spirit of the present invention.

INDUSTRIAL APPLICABILITY

A thermally conductive ceramic-polymer composite of the present invention can be applied to a product requiring high electrical insulation and thermal conductivity, and has industrial applicability.

The invention claimed is:

1. A thermally conductive ceramic-polymer composite, in which thermoplastic polymers form a matrix, and
   planar fragments of thermally conductive ceramic or thermally conductive ceramic powder is dispersed on a grain boundary between thermoplastic polymer particles, thereby forming a thermal pathway,
   wherein the thermoplastic polymer particles are formed in a faceted shape, and
   the average size of the planar fragments of thermally conductive ceramic or thermally conductive ceramic powder is less than 10% of an average size of the thermoplastic polymer particles,
   and a volume of the planar fragments of thermally conductive ceramic or thermally conductive ceramic powder located on the grain boundary between the thermoplastic polymer particles is at least 90% of a volume of the planar fragments of thermally conductive ceramic or thermally conductive ceramic powder distributed in the entire matrix.

2. The thermally conductive ceramic-polymer composite of claim 1, wherein the planar fragments of thermally conductive ceramic or thermally conductive ceramic powder is surface-treated with a coupling agent, thereby forming chemical bonds with the thermoplastic polymer particles, and
   consists of one or more materials selected from boron nitride, aluminum nitride, magnesium oxide, aluminum oxide, silicon carbide and silicon nitride.

3. The thermally conductive ceramic-polymer composite of claim 1, wherein the thermoplastic polymer is one or more materials selected from acrylonitrile butadiene styrene, polymethylmethacrylate, polyamide, polybutadiene-terephthalate, polyethylene terephthalate, polycarbonate, polyethylene, polyetheretherketone, polypropylene, polystyrene and polymethylsilsesquioxane, and
   a volumetric ratio of the planar fragments of thermally conductive ceramic or thermally conductive ceramic powder and the thermoplastic polymers is 1:3 to 30.

4. A method of preparing a thermally conductive ceramic-polymer composite, the method comprising:
   (a) surface-treating planar fragments of thermally conductive ceramic or thermally conductive ceramic powder with a coupling agent to induce chemical bonds of the planar fragments of thermally conductive ceramic or thermally conductive ceramic powder to be uniformly coated on thermoplastic polymer beads;
   (b) adding the thermoplastic polymer beads and the surface-treated planar fragments of thermally conductive ceramic or thermally conductive ceramic powder to a solvent having insolubility with respect to the thermoplastic polymer beads to be dispersed;
   (c) forming a ceramic-polymer composite powder in which the planar fragments of thermally conductive ceramic or thermally conductive ceramic powder is coated on surfaces of the thermoplastic polymer beads by evaporating the solvent; and
   (d) molding the ceramic-polymer composite powder by applying pressure,
   wherein the average size of the planar fragments of thermally conductive ceramic or thermally conductive ceramic powder is smaller than 1/10 of that of the thermoplastic polymer beads,
   thermoplastic polymer particles are formed in a faceted shape as the thermoplastic polymer beads are transformed into a faceted shape in the molding,
   the planar fragments of thermally conductive ceramic or thermally conductive ceramic powder is dispersed on a grain boundary between thermoplastic polymer particles, thereby forming a thermal pathway, and a volume of the planar fragments of thermally conductive ceramic or thermally conductive ceramic powder located on the grain boundary between the thermoplastic polymer particles is at least 90% of a volume of the planar fragments of thermally conductive ceramic or thermally conductive ceramic powder distributed in the entire matrix.

5. The method of claim 4, wherein the planar fragments of thermally conductive ceramic or thermally conductive ceramic powder is one or more materials selected from boron nitride, aluminum nitride, magnesium oxide, aluminum oxide, silicon carbide and silicon nitride.

6. The method of claim 4, wherein the thermoplastic polymer beads consist of one or more materials selected from acrylonitrile butadiene styrene, polymethylmethacrylate, polyamide, polybutadieneterephthalate, polyethylene terephthalate, polycarbonate, polyethylene, polyetheretherketone, polypropylene, polystyrene and polymethylsilsesquioxane, and
have an average size of 100 nm to 100 μm.

7. The method of claim 4, wherein, in the operation (b), the planar fragments of thermally conductive ceramic or thermally conductive ceramic powder and the thermoplastic polymer beads are added at a volumetric ratio of 1:3 to 30.

8. The method of claim 4, wherein the coupling agent is one or more coupling agents selected from a silicon-based coupling agent, a zirconium-based coupling agent and a titanium-based coupling agent, and
is added at 0.1 to 5.0 parts by weight with respect to 100 parts by weight of the planar fragments of thermally conductive ceramic or thermally conductive ceramic powder.

9. The method of claim 4, wherein the molding is performed by applying a pressure in a range of 10 to 1000 MPa at a temperature ranging from a glass transition temperature or higher of the thermoplastic polymer beads to less than a melting point of the thermoplastic polymer beads to increase a contact interface between the thermoplastic polymer beads.

10. The method of claim 4, wherein, in the operation (a), the surface treatment is performed by adding the planar fragments of thermally conductive ceramic or thermally conductive ceramic powder and the coupling agent to the solvent, and
the solvent used in the operation (a) has a pH ranging from 2.0 to 6.5.

* * * * *